(12) United States Patent
Liao et al.

(10) Patent No.: US 11,466,823 B2
(45) Date of Patent: Oct. 11, 2022

(54) LIGHT BOX APPARATUS

(71) Applicant: XIAMEN LEEDARSON LIGHTING CO.LTD, Fujian (CN)

(72) Inventors: Qingyue Liao, Fujian (CN); Liangliang Cao, Fujian (CN)

(73) Assignee: XIAMEN LEEDARSON LIGHTING CO. LTD, Fujian (CN)

( * ) Notice: Subject to any disclaimer, the term of this patent is extended or adjusted under 35 U.S.C. 154(b) by 210 days.

(21) Appl. No.: 16/916,530

(22) Filed: Jun. 30, 2020

(65) Prior Publication Data

US 2021/0404614 A1 Dec. 30, 2021

(51) Int. Cl.

| F21S 4/00 | (2016.01) |
|---|---|
| F21S 4/28 | (2016.01) |
| F21V 3/00 | (2015.01) |
| F21V 23/00 | (2015.01) |
| F21V 19/00 | (2006.01) |
| F21V 23/06 | (2006.01) |
| F21V 5/00 | (2018.01) |
| F21S 10/00 | (2006.01) |
| F21V 33/00 | (2006.01) |
| H05B 47/16 | (2020.01) |
| H05B 47/155 | (2020.01) |
| F21V 23/04 | (2006.01) |

(Continued)

(52) U.S. Cl.
CPC ............... *F21S 4/28* (2016.01); *F21S 10/00* (2013.01); *F21V 3/00* (2013.01); *F21V 5/007* (2013.01); *F21V 19/0075* (2013.01); *F21V 23/007* (2013.01); *F21V 23/0435* (2013.01); *F21V 23/06* (2013.01); *F21V 33/0056* (2013.01); *H05B 47/155* (2020.01); *H05B 47/16* (2020.01); *F21Y 2103/10* (2016.08); *F21Y 2115/10* (2016.08)

(58) Field of Classification Search
CPC .. F21S 4/28; F21S 10/00; F21V 5/007; F21V 19/0075; F21V 23/007; F21V 23/0435; F21V 23/06; F21V 33/0056; F21V 3/00; H05B 47/16; H05B 47/155
See application file for complete search history.

(56) References Cited

U.S. PATENT DOCUMENTS

| 10,024,502 B1* | 7/2018 | Purdy | ................. F21V 19/0075 |
|---|---|---|---|
| 2006/0028837 A1* | 2/2006 | Mrakovich | ............... F21S 4/28 |
| | | | 362/602 |
| 2022/0039241 A1* | 2/2022 | Van Bommel et al. | ..................... |
| | | | H05B 47/16 |

* cited by examiner

*Primary Examiner* — Y M. Quach Lee
(74) *Attorney, Agent, or Firm* — Chun-Ming Shih; Lanway IPR Services

(57) ABSTRACT

A light box includes a light passing cover printed with an image. The image is being logically divided into two-dimension blocks. The light box includes multiple light tubes. Each light tube includes a tubular housing, an elongated LED bar, and a controller. The elongated LED bar is being enclosed by the tubular housing. The elongated LED bar has multiple LED modules divided into multiple LED sections. The multiple light tubes is being disposed behind the image of the light passing cover. The multiple LED sections of multiple light tubes is being corresponding to the two-dimension blocks of the image respectively. The controller controls the multiple LED sections separately according to a stored script. The stored script indicate a timing sequence for controlling the multiple LED sections for illuminating the two-dimension blocks of the image according to the stored script.

20 Claims, 9 Drawing Sheets

(51) Int. Cl.
*F21Y 103/10* (2016.01)
*F21Y 115/10* (2016.01)

LIGHT BOX APPARATUS

FIELD

The present invention is related to a LED lighting and more particularly related to a light box apparatus.

BACKGROUND

Lighting or illumination is the deliberate use of light to achieve a practical or aesthetic effect. Lighting includes the use of both artificial light sources like lamps and light fixtures, as well as natural illumination by capturing daylight. Daylighting (using windows, skylights, or light shelves) is sometimes used as the main source of light during daytime in buildings. This can save energy in place of using artificial lighting, which represents a major component of energy consumption in buildings. Proper lighting can enhance task performance, improve the appearance of an area, or have positive psychological effects on occupants.

Indoor lighting is usually accomplished using light fixtures and is a key part of interior design. Lighting can also be an intrinsic component of landscape projects.

A light-emitting diode (LED) is a semiconductor light source that emits light when current flows through it. Electrons in the semiconductor recombine with electron holes, releasing energy in the form of photons. This effect is called electroluminescence. The color of the light (corresponding to the energy of the photons) is determined by the energy required for electrons to cross the band gap of the semiconductor. White light is obtained by using multiple semiconductors or a layer of light-emitting phosphor on the semiconductor device.

Appearing as practical electronic components in 1962, the earliest LEDs emitted low-intensity infrared light. Infrared LEDs are used in remote-control circuits, such as those used with a wide variety of consumer electronics. The first visible-light LEDs were of low intensity and limited to red. Modern LEDs are available across the visible, ultraviolet, and infrared wavelengths, with high light output.

Early LEDs were often used as indicator lamps, replacing small incandescent bulbs, and in seven-segment displays. Recent developments have produced white-light LEDs suitable for room lighting. LEDs have led to new displays and sensors, while their high switching rates are useful in advanced communications technology.

LEDs have many advantages over incandescent light sources, including lower energy consumption, longer lifetime, improved physical robustness, smaller size, and faster switching. Light-emitting diodes are used in applications as diverse as aviation lighting, automotive headlamps, advertising, general lighting, traffic signals, camera flashes, lighted wallpaper and medical devices.

Unlike a laser, the color of light emitted from an LED is neither coherent nor monochromatic, but the spectrum is narrow with respect to human vision, and functionally monochromatic.

The energy efficiency of electric lighting has increased radically since the first demonstration of arc lamps and the incandescent light bulb of the 19th century. Modern electric light sources come in a profusion of types and sizes adapted to many applications. Most modern electric lighting is powered by centrally generated electric power, but lighting may also be powered by mobile or standby electric generators or battery systems. Battery-powered light is often reserved for when and where stationary lights fail, often in the form of flashlights, electric lanterns, and in vehicles.

Although lighting devices are widely used, there are still lots of opportunity and benefit to improve the lighting devices to provide more convenient, low cost, reliable and beautiful lighting devices for enhancing human life.

SUMMARY

A light box includes a light passing cover printed with an image. The image is being logically divided into two-dimension blocks. The light box also includes multiple light tubes. Each light tube has a tubular housing, an elongated LED bar, and a controller. The elongated LED bar is being enclosed by the tubular housing. The elongated LED bar has multiple LED modules divided into multiple LED sections. The multiple light tubes being disposed behind the image of the light passing cover. The multiple LED sections of multiple light tubes being corresponding to the two-dimension blocks of the image respectively. The controller controls the multiple LED sections separately according to a stored script. The stored script indicates a timing sequence for controlling the multiple LED sections for illuminating the two-dimension blocks of the image according to the stored script. A bracket is for positioning the multiple light tubes aligning to the image of the light passing cover.

In some embodiments, there is a sensor for detecting whether there is a person nearby. Four light tubes are disposed on a bracket. The bracket is expandable to change a relative distance between two adjacent light tubes. The light tube has a controller. The light tube has multiple LED modules divided into multiple LED sections. There is a tubular housing allows at least of a portion of surface to pass lights emitted from the LED sections. The four light tubes each has four LED sections. The controller in each light tube controls the LED sections according to a stored script. The stored script contains information on when to turn on, to turn off, to adjust luminance level, to change color of the LED sections. For example, in time t0, the LED section 301 is turned on while the other LED section 302 is turned off. In time t1, the LED section 301 is turned off while the other LED section 302 is turned on. Such information is sent to the controllers of the light tubes so that the controllers control the LED sections separately according to the stored script to illuminate the two-dimension blocks. In other words, different portions of the image may be highlighted in turn, to create an impressive visual affect. This is particularly helpful in advertisement plates. Unlike conventional advertisement plate, which only illuminates its complete image, the embodiments mentioned above provide more elegant and attractive solution. Besides, such solution, in some aspect, provides lower cost compared with LED array light sources. It is easier to install multiple light tubes.

In some embodiments, each light tube has a timer and the controller of each light tube controls the LED sections by reference to the timer.

In some embodiments, one of the multiple light tubes sends a synchronization message to other light tubes to synchronize the controlling of the multiple light tubes. When there are multiple light tubes used together, one light tube may be assigned as a master light tube and others as slave light tubes. The master light tube may send synchronization signal to slave light tubes so that all light tubes are aligned in time for playing visual effect in the stored script.

In some embodiments, the synchronization signal may be an optical signal. For example, the synchronization signal is a specific on/off sequences to be received and recognized by a simple light sensor in another light tube. When the another light tube receives the specific pattern of on/off sequence, the another light tube starts to control its LED sections based on the stored script.

In some embodiments, the light tube has a battery for keeping a clock for the timer even when the light tube is not supplied with electricity. There is a battery for the timer to keep a clock function, even when the light tube is not provided with electricity.

In some embodiments, each controller has a complete script corresponding to the blocks of the image. The light tube has a switch to indicate a position of the light tube located in the multiple light tubes. For example, a performance of a stored script may involve four light tubes. The complete stored script providing complete information on when each light tube needs to turn on or to turn off is stored to all four light tubes. Each of the four light tubes needs to know which position the light tube is located in the four light tubes so as to execute a correct portion of the stored script. To solve the problem, each light tube may have a manual switch to be set to one, two, three, or four to indicate a relative position of the light tube located in the four light tubes. The switch sends the position information to the controller so that the controller knows which portion of the stored script needs to be executed. When every light tube knows correctly which portion of the stored script needs to be performed, the four light tubes together show a desired program according to the stored script.

In some embodiments, the controller of the light tube sends an identifier of the light tube to an external device and controls the LED sections according to a command of the external device for the external device to determine positions of the multiple light tubes. As mentioned above, it is important to provide a convenient and efficient way to recognize positions of the light tubes when multiple light tubes are used.

In the example, a mobile phone is installed corresponding app for doing following steps.

First, the mobile phone sends a broadcast message to all four light tubes.

Each light tube when receiving the broadcast message replies with its identifier, e.g. a unique identification code, to the mobile phone.

The mobile phone now knows there are four light tubes installed and corresponding identifiers. The mobile phone assigns each light tube a time slot and instructs the light tubes to turn on in an assigned time sequence.

The mobile phone takes pictures of the four light tubes and associates the identifiers with the positions of the four light tubes.

After the work is done, the mobile phone generates the stored script, either the same for all four light tubes or different for the four light tubes and sends the stored script to the four light tubes. Then, the controllers of the four light tubes control LED sections according to the stored script.

With such design, the mobile phone may be programmed with an app to edit time sequence of the stored script.

In some embodiments, the bracket is an expandable bracket for changing a relative distance between two adjacent light tubes. The bracket may be expandable for changing a relative distance between two adjacent light tubes.

In some embodiments, an expanding parameter is forwarded to the controller for changing a light beam angle of the LED section. The expanding parameter of the bracket may be sent to the controllers of the light tubes so that a light beam angle, e.g. a wider angle light output or a narrower angle light output should be provided to prevent dark patterns appearing on the light passing cover.

In some embodiments, the bracket sends a position message to the controller of the light tube to indicate the controller of the light tube a relative position of the light tube in the multiple light tubes.

In some embodiments, a light tube is inserted to a socket of a bracket. The position information of the light tube among all light tubes is sent to the controller of the light tube.

In some embodiments, the stored script is stored in a memory card inserted into one of the multiple light tubes, and a data of the stored script are transmitted to other light tubes.

In some embodiments, a server is embedded in the controller of one light tube, other light tubes access the server for retrieving the stored script.

In some embodiments, a controller of one light tube is installed with a server, e.g. a HTTP server. Other light tubes receive the stored script from the server. In addition, an external device may provide or change the stored script via the server. For example, when the server is an HTTP server, the external device may edit and change the stored script from a general web browser by accessing a HTML page stored on the HTTP server of the light tube.

In some embodiments, the multiple light tubes and the bracket are made as a content module. In some embodiments, the light passing cover printed with the image and the light tubes with the bracket are made as a module. In such embodiments, designers may easily modify the stored script and see the visual effect. When the work is done, the module is brought to the light box to be installed.

The light box may have original light tubes and a socket. The original light tubes may be used for illuminating other static images. When the module is installed to the light box, the socket is used for providing electricity to the module. In addition, the original light tubes may be disabled when necessary so as to replace the original light tubes with the module.

In some embodiments, there is a socket for connecting to the content module and for disabling original light tubes when necessary.

In some embodiments, a proximity sensor is disposed on the light passing cover for detecting whether there is a user nearby and transmits the detected result to the controller to adjust controlling of the LED section. When a person is approaching, the information may be passed to controllers of the light tubes to adjust behaviors of the light tubes, thus, to change a different visual effect depending on whether there is a person nearby.

In some embodiments, the controller controls the LED sections to emit lights of different colors according to the stored script.

In some embodiments, the LED sections are controlled to turn on, to turn off, to increase or decrease luminance level, to change colors, to change color temperatures or adjust other settings.

In some embodiments, the LED tube comprises a speaker, the controller controls the speaker to generate a sound effect according to the stored script. In some embodiments, the light tube also has a speaker for generating a sound effect according to the stored script.

In some embodiments, the LED section is covered by a lens for directing output light to one corresponding two-dimension block.

In some embodiments, the light source plate has a first set of LED chips and a second set of LED chips. The first set of LED chips are covered by a lens for directing output light to one corresponding two-dimension block mentioned above.

In some embodiments, the LED section includes an environment LED module and a light beam LED module. The light beam LED module is covered by a lens.

In some embodiments, the second set of LED chips are not covered by the lens and emit environment light to the light passing cover.

In some embodiments, a second light passing cover printed with a second image is disposed on an opposite side of the light passing cover. The multiple LED tubes have two LED sides respectively having the LED sections corresponding to the image of the light passing cover and the second image of the second light passing cover respectively. The controller controls the first LED side and the second LED side independently.

In some embodiments, the light box has two light passing covers arranged in opposite sides. The light tube has two corresponding LED sides for illuminating images on the two light passing covers. The two LED sides may be controlled independently, thus having more design options.

In some embodiments, the controller receives a wireless command from an external device. When the wireless command is received, the controller ignores the stored script and controls the LED sections according to the wireless command.

DETAILED DESCRIPTION

Figure 1:
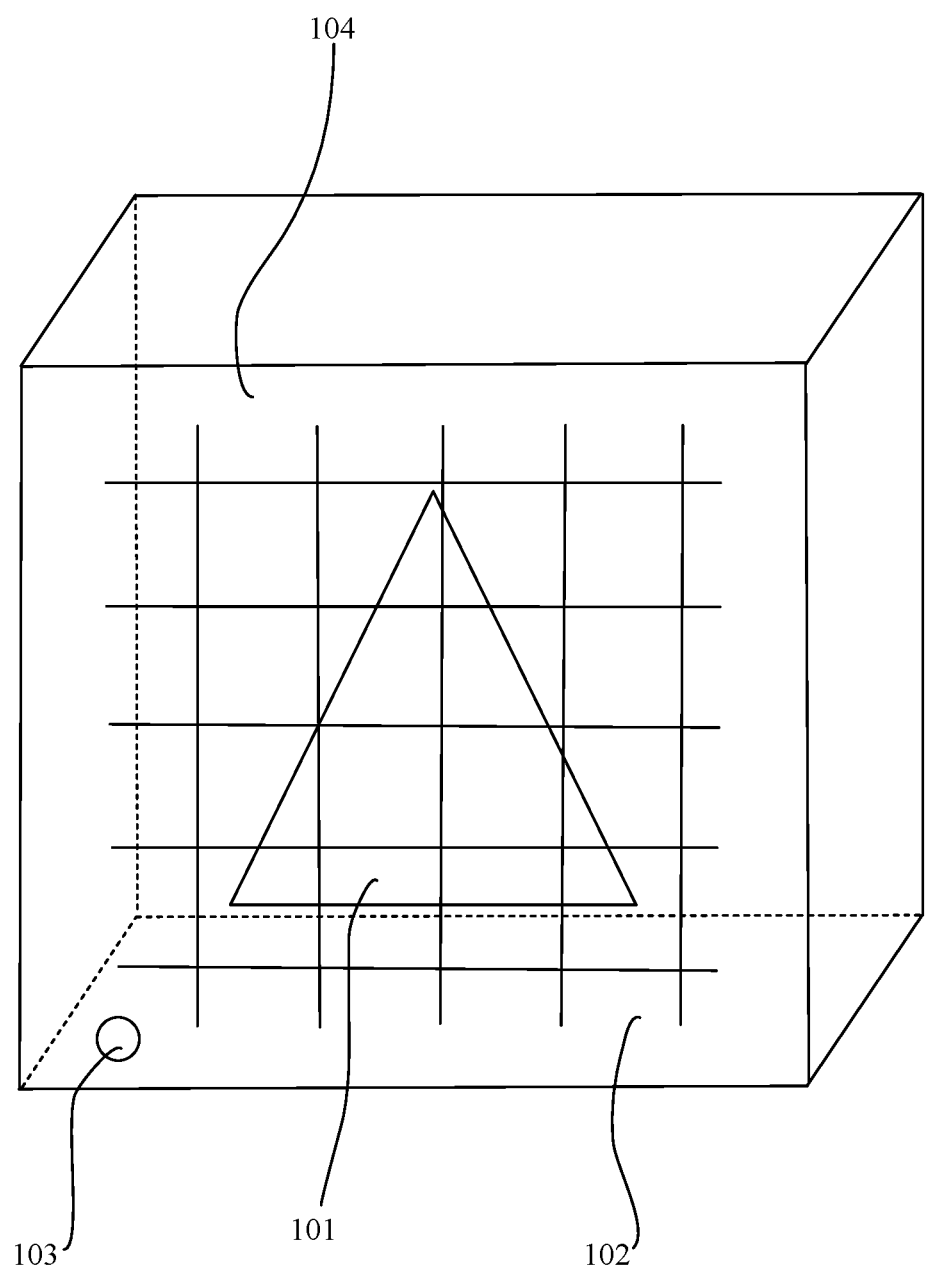
FIG. 1 is a schematic view of a light box apparatus according to an embodiment of the present disclosure.
Figure 2:
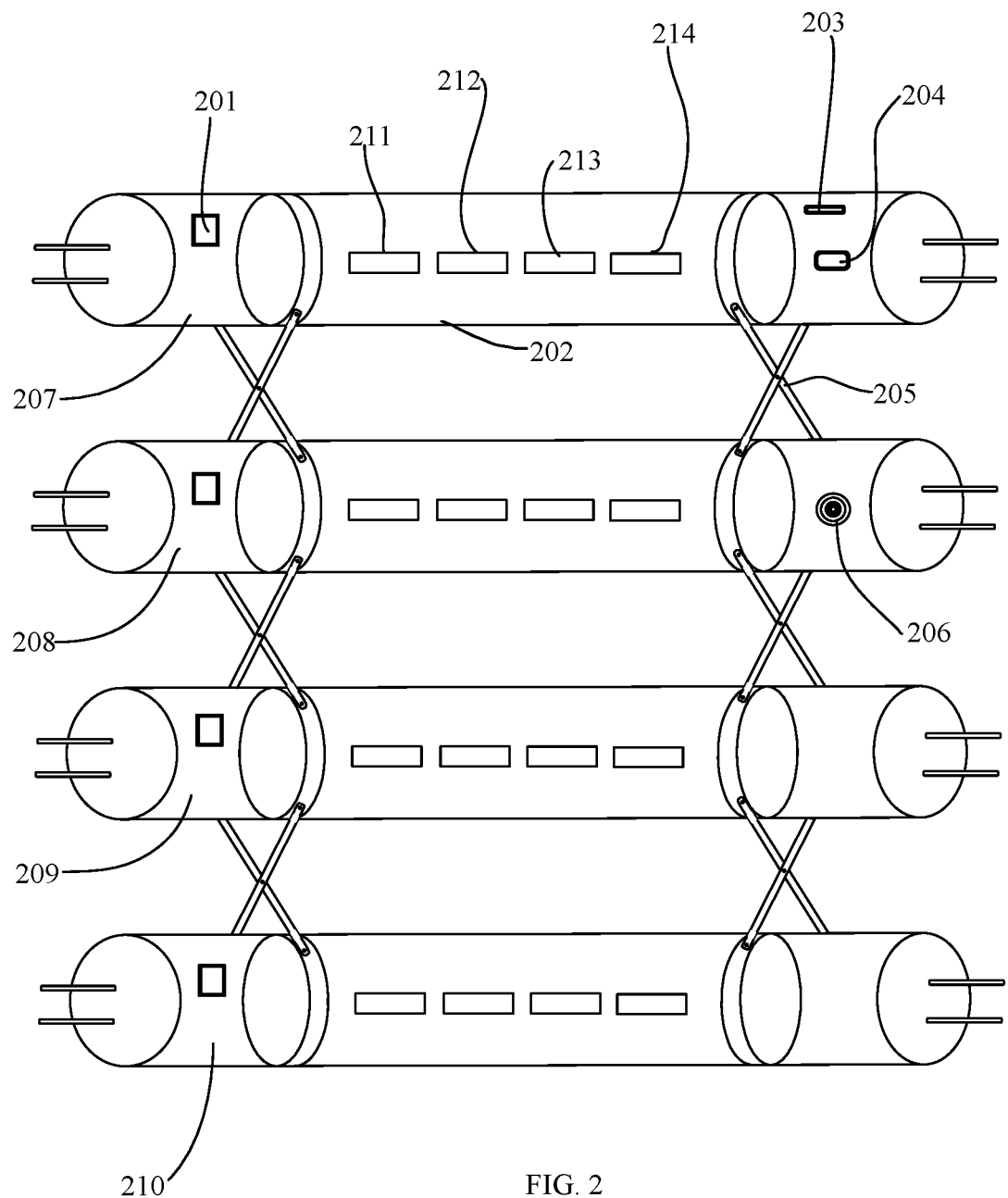
FIG. 2 is a perspective view of a light box apparatus according to an embodiment of the present disclosure.
Figure 3A:
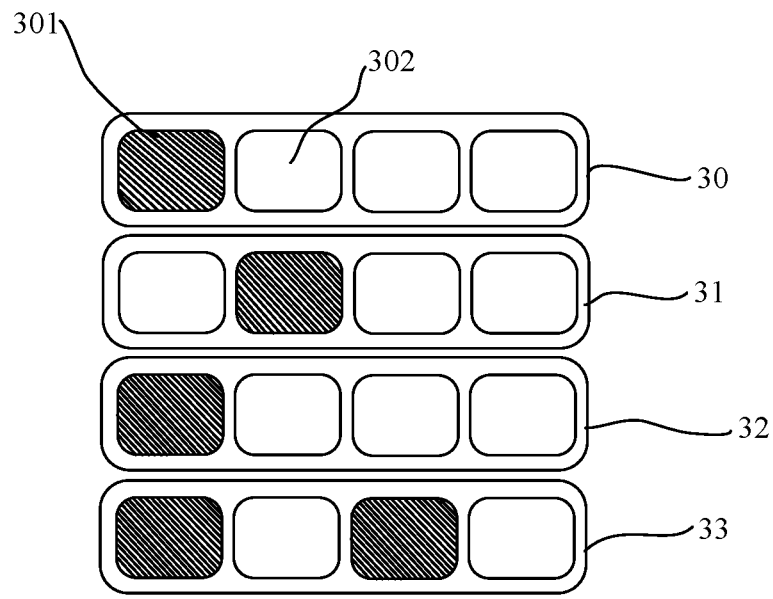
FIG. 3A is a schematic view of a light box apparatus according to an embodiment of the present disclosure.
Figure 3B:
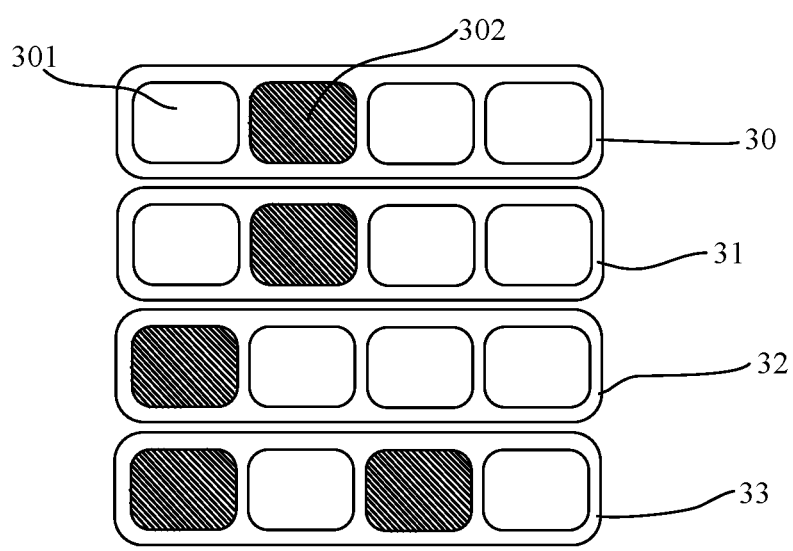
FIG. 3B is a schematic view of a light box apparatus according to an embodiment of the present disclosure.

Please refer to FIG. 1. In FIG. 1, a light box apparatus includes a light passing cover 104 printed with an image 101. The image 101 is logically divided into multiple two-dimension blocks 102. There is a sensor 103 for detecting whether there is a person nearby. Please refer to FIG. 2. In FIG. 2, four light tubes 207, 208, 209, 210 are disposed on a bracket 205. The bracket is expandable to change a relative distance between two adjacent light tubes. The light tube 207 has a controller 201. The light tube 207 has multiple LED modules divided into multiple LED sections 211, 212, 213, 214. There is a tubular housing 202 allows at least of a portion of surface to pass lights emitted from the LED sections 211, 212, 213, 214. Please refer to FIG. 3A and FIG. 3B. In FIG. 3A and FIG. 3B, four light tubes 30, 31, 32, 33 each has four LED sections. The controller in each light tube controls the LED sections according to a stored script. The stored script contains information on when to turn on, to turn off, to adjust luminance level, to change color of the LED sections. For example, in time t0, the LED section 301 is turned on while the LED section 302 is turned off. In time t1, the LED section 301 is turned off while the LED section 302 is turned on. Such information is sent to the controllers of the light tubes so that the controllers control the LED sections separately according to the stored script to illuminate the two-dimension blocks. In other words, different portions of the image may be highlighted in turn, to create an impressive visual affect. This is particularly helpful in advertisement plates. Unlike conventional advertisement plate, which only illuminates its complete image, the embodiments mentioned above provide more elegant and attractive solution. Besides, such solution, in some aspect, provides lower cost compared with LED array light sources. It is easier to install multiple light tubes.

Please refer to FIG. 2. In FIG. 2, each light tube may have a timer 204. When there are multiple light tubes used together, one light tube may be assigned as a master light tube and others as slave light tubes. The master light tube may send synchronization signal to slave light tubes so that all light tubes are aligned in time for playing visual effect in the stored script.

The synchronization signal may be an optical signal. For example, the synchronization signal is a specific on/off sequences to be received and recognized by a simple light sensor in another light tube. When the another light tube receives the specific pattern of on/off sequence, the another light tube starts to control its LED sections based on the stored script.

In FIG. 2, there is a battery 203 for the timer to keep a clock function, even when the light tube is not provided with electricity.

For example, a performance of a stored script may involve four light tubes. The complete stored script providing complete information on when each light tube needs to turn on or to turn off is stored to all four light tubes.

Each of the four light tubes needs to know which position the light tube is located in the four light tubes so as to execute a correct portion of the stored script.

To solve the problem, each light tube may have a manual switch to be set to one, two, three, or four to indicate a relative position of the light tube located in the four light tubes.

The switch sends the position information to the controller so that the controller knows which portion of the stored script needs to be executed.

When every light tube knows correctly which portion of the stored script needs to be performed, the four light tubes together show a desired program according to the stored script.

As mentioned above, it is important to provide a convenient and efficient way to recognize positions of the light tubes when multiple light tubes are used.

Figure 4A:
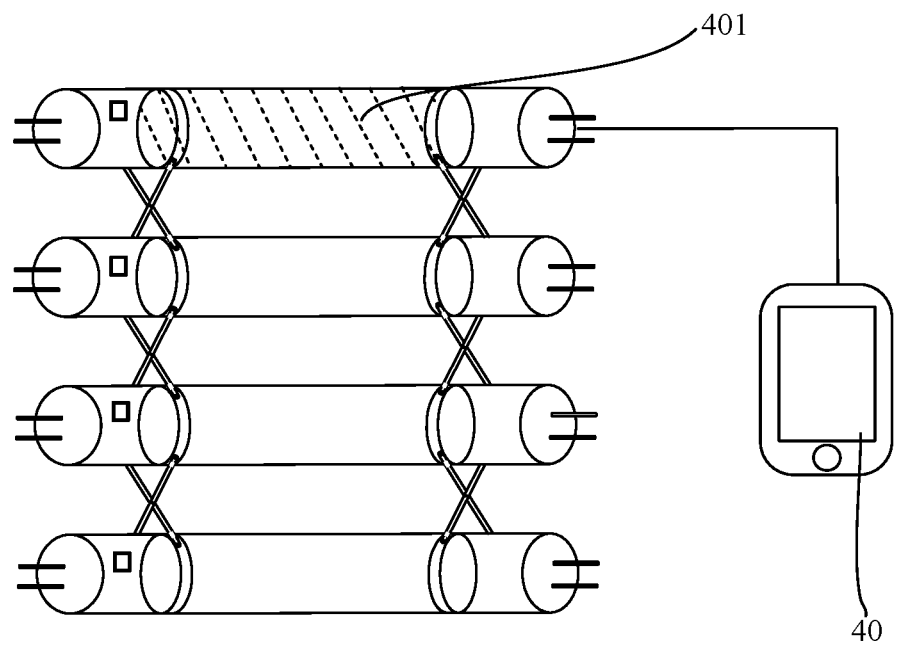
FIG. 4A is a perspective view of a light box apparatus according to an embodiment of the present disclosure.
Figure 4B:
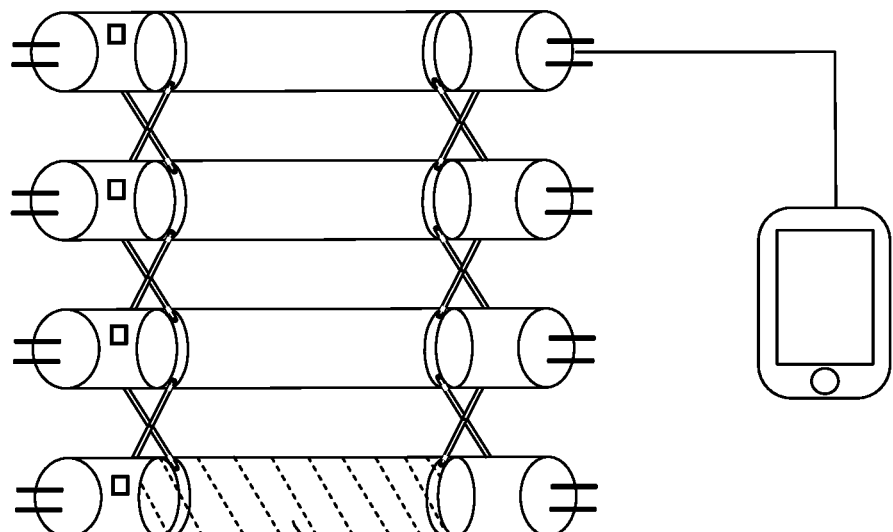
FIG. 4B is a perspective view of a light box apparatus according to an embodiment of the present disclosure.

In the example of FIG. 4A and FIG. 4B, a mobile phone 40 is installed corresponding app for doing following steps.

First, the mobile phone 40 sends a broadcast message to all four light tubes.

Each light tube 401, 402 when receiving the broadcast message replies with its identifier, e.g. a unique identification code, to the mobile phone 40.

The mobile phone 40 now knows there are four light tubes installed and corresponding identifiers. The mobile phone assigns each light tube a time slot and instructs the light tubes to turn on in an assigned time sequence.

The mobile phone takes pictures of the four light tubes and associates the identifiers with the positions of the four light tubes.

After the work is done, the mobile phone generates the stored script, either the same for all four light tubes or different for the four light tubes and sends the stored script to the four light tubes. Then, the controllers of the four light tubes control LED sections according to the stored script.

With such design, the mobile phone may be programmed with an app to edit time sequence of the stored script.

Please refer to FIG. 1. In FIG. 1, there are expandable brackets 205 used for connecting light tubes.

The bracket 205 may be expandable for changing a relative distance between two adjacent light tubes.

The expanding parameter of the bracket may be sent to the controllers of the light tubes so that a light beam angle, e.g. a wider angle light output or a narrower angle light output should be provided to prevent dark patterns appearing on the light passing cover.

Figure 8:
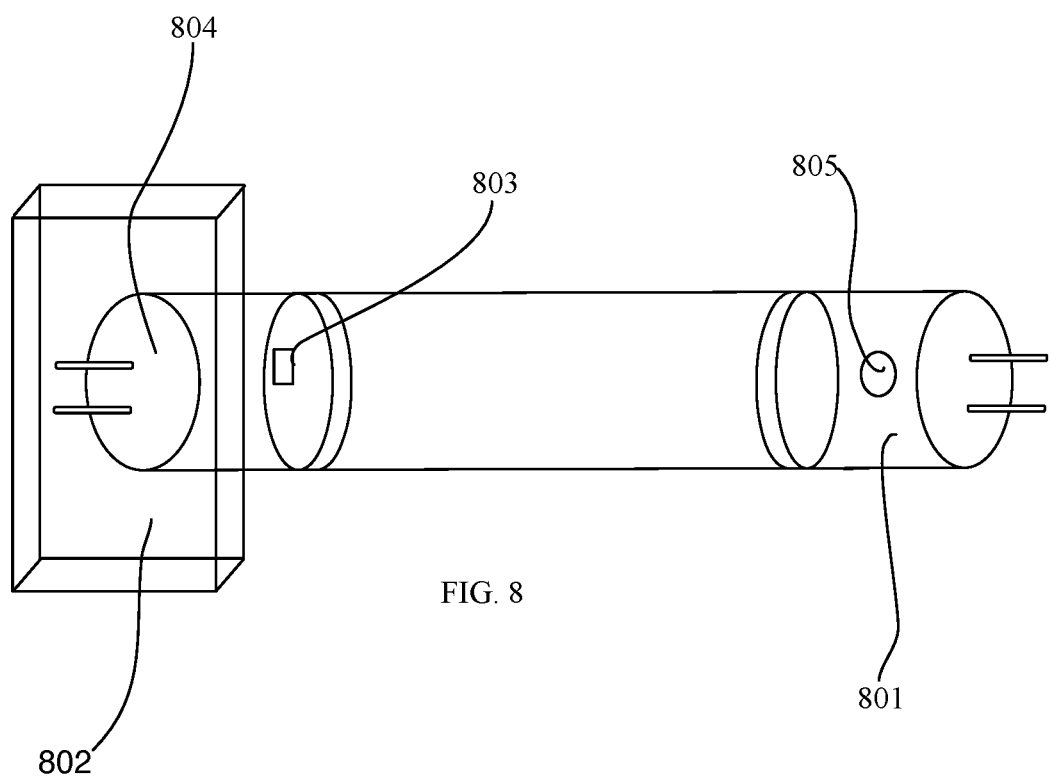
FIG. 8 is a schematic view of a light box apparatus according to an embodiment of the present disclosure.

Please refer to FIG. 8. In FIG. 8, a light tube is inserted to a socket 804 of a bracket 802. The position information of the light tube among all light tubes is sent to the controller 803 of the light tube 801.

Figure 9:
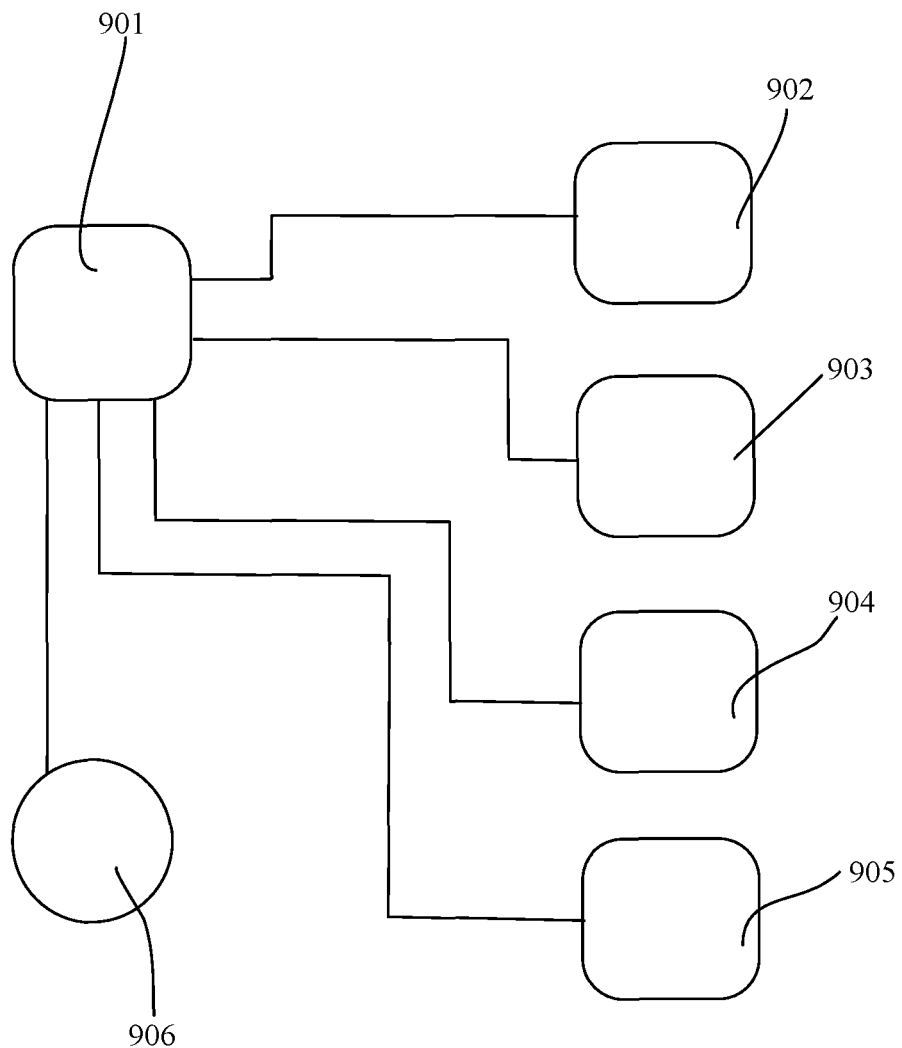
FIG. 9 is a schematic view of a light box apparatus according to an embodiment of the present disclosure.

Please refer to FIG. 9. In FIG. 9, a controller of one light tube 901 is installed with a server, e.g. a HTTP server. Other light tubes 902, 903, 904, 905 receive the stored script from the server.

In addition, an external device 906 may provide or change the stored script via the server. For example, when the server is an HTTP server, the external device 906 may edit and change the stored script from a general web browser by accessing a HTML page stored on the HTTP server of the light tube 901.

Figure 5:
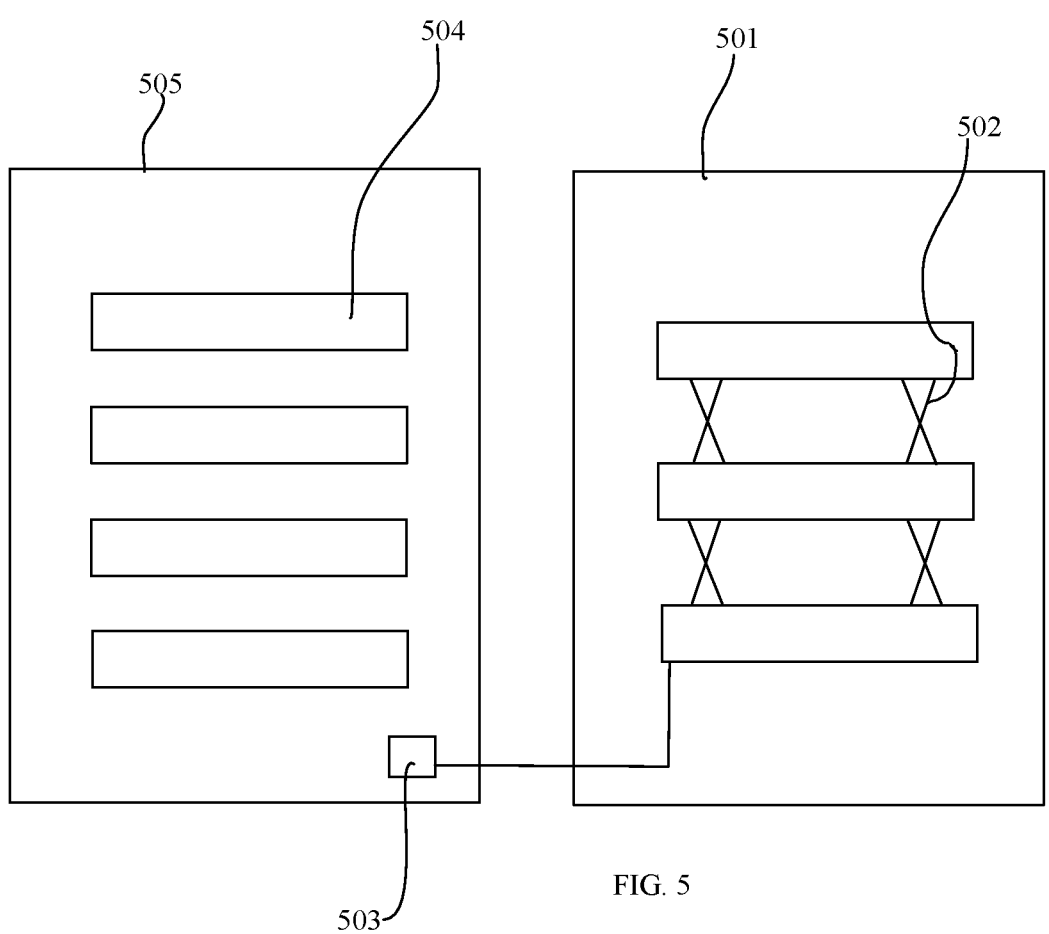
FIG. 5 is a schematic view of a light box apparatus according to an embodiment of the present disclosure.

Please refer to FIG. 5. In FIG. 5, the light passing cover 501 printed with the image and the light tubes with the bracket 502 are made as a module.

In such embodiments, designers may easily modify the stored script and see the visual effect. When the work is done, the module is brought to the light box 505 to be installed. The light box 505 may have original light tubes 504 and a socket 503. The original light tubes 504 may be used for illuminating other static images.

When the module is installed to the light box 505, the socket 503 is used for providing electricity to the module. In addition, the original light tubes may be disabled when necessary so as to replace the original light tubes with the module.

Please refer to FIG. 1. There is a proximity sensor 103 disposed on the light passing cover 104. When a person is approaching, the information may be passed to controllers of the light tubes to adjust behaviors of the light tubes, thus, to change a different visual effect depending on whether there is a person nearby.

In FIG. 2, the light tube also has a speaker for generating a sound effect according to the stored script.

Figure 6:
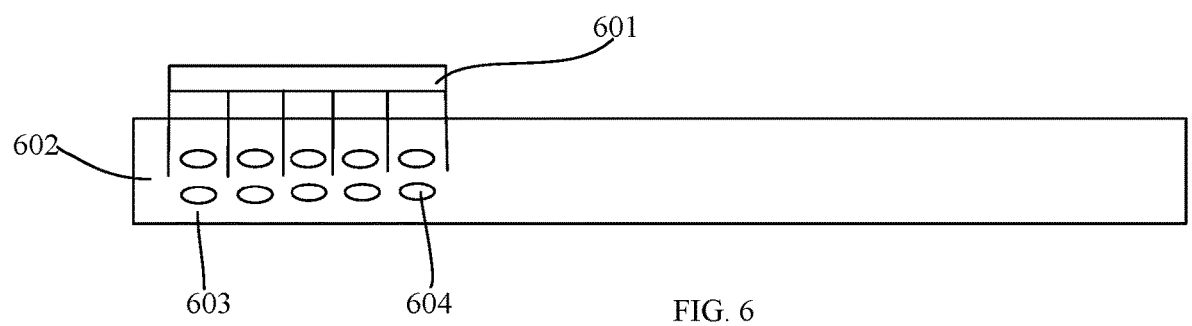
FIG. 6 is a schematic view of a light box apparatus according to an embodiment of the present disclosure.

In FIG. 6, the light source plate 602 has a first set of LED chips 603 and a second set of LED chips 604. The first set of LED chips 603 are covered by a lens 601 for directing output light to one corresponding two-dimension block mentioned above.

In FIG. 6, the second set of LED chips 604 are not covered by the lens 601 and emit environment light to the light passing cover.

Figure 7:
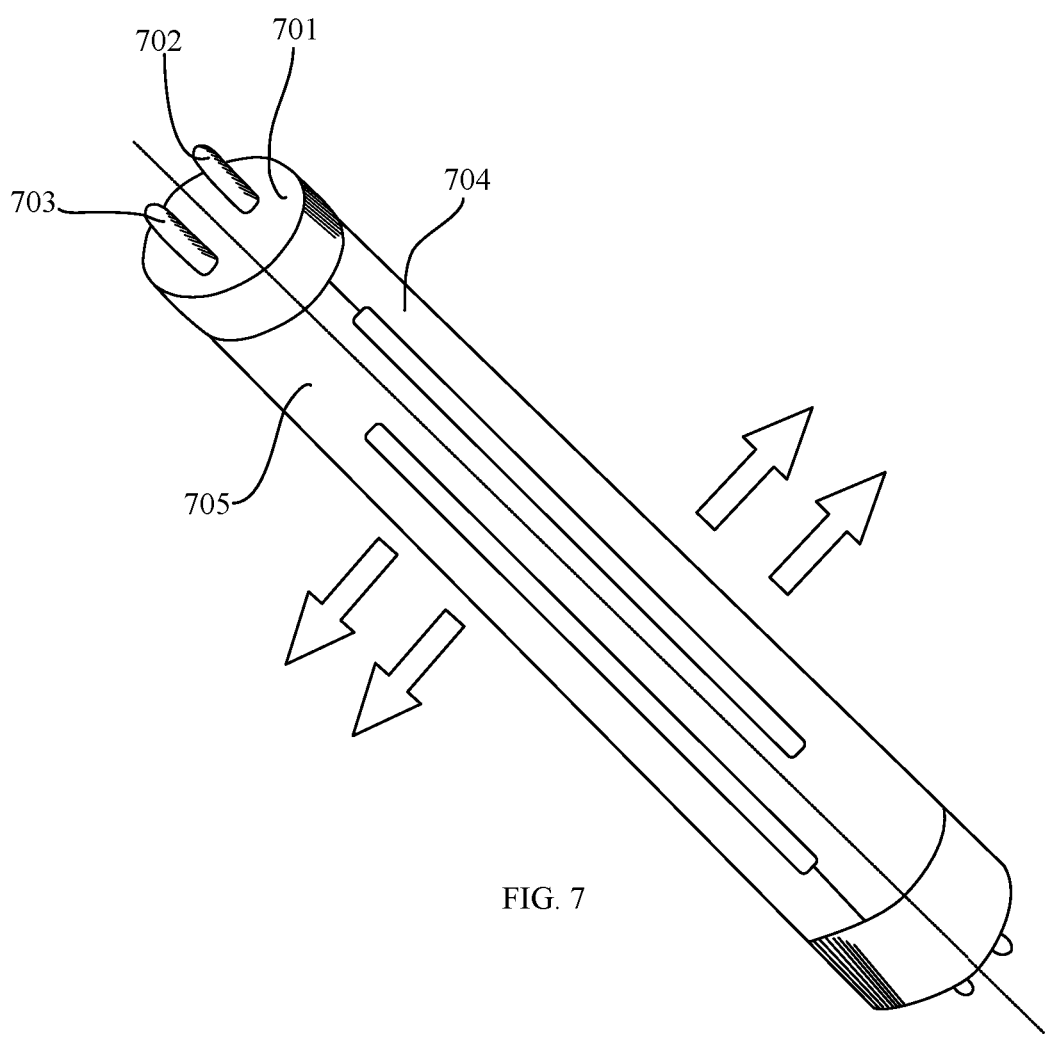
FIG. 7 is a schematic view of a light box apparatus according to an embodiment of the present disclosure.

In FIG. 7, the light box has two light passing covers 704, 705 arranged in opposite sides. The light tube 701 has two corresponding LED sides 702, 703 for illuminating images on the two light passing covers 704, 705.

The two LED sides 702, 703 may be controlled independently, thus having more design options.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A light box, comprising:
a light passing cover printed with an image, the image being logically divided into two-dimension blocks;
multiple light tubes, each light tube comprising a tubular housing, an elongated LED bar, and a controller, the elongated LED bar being enclosed by the tubular housing, the elongated LED bar having multiple LED modules divided into multiple LED sections, the multiple light tubes being disposed behind the image of the light passing cover, the multiple LED sections of multiple light tubes being corresponding to the two-dimension blocks of the image respectively, the controller controlling the multiple LED sections separately according to a stored script, the stored script indicating a timing sequence for controlling the multiple LED sections for illuminating the two-dimension blocks of the image according to the stored script; and
a bracket for positioning the multiple light tubes aligning to the image of the light passing cover.

2. The light box apparatus of claim 1, wherein each light tube has a timer and the controller of each light tube controls the LED sections by reference to the timer.

3. The light box apparatus of claim 2, wherein one of the multiple light tubes sends a synchronization message to other light tubes to synchronize the controlling of the multiple light tubes.

4. The light box apparatus of claim 3, wherein the light tube has a battery for keeping a clock for the timer even when the light tube is not supplied with electricity.

5. The light box apparatus of claim 1, wherein each controller has a complete script corresponding to the blocks of the image, the light tube has a switch to indicate a position of the light tube located in the multiple light tubes.

6. The light box apparatus of claim 1, wherein the controller of the light tube sends an identifier of the light tube to an external device and controls the LED sections according to a command of the external device for the external device to determine positions of the multiple light tubes.

7. The light box apparatus of claim 1, wherein the bracket is an expandable bracket for changing a relative distance between two adjacent light tubes.

8. The light box apparatus of claim 7, wherein an expanding parameter is forwarded to the controller for changing a light beam angle of the LED section.

9. The light box apparatus of claim 1, wherein a position of the bracket indicates a relative position of the light tube to the controller of the light tube to indicate the controller of the light tube a relative position of the light tube in the multiple light tubes.

10. The light box apparatus of claim 1, wherein the stored script is stored in a memory card inserted into one of the multiple light tubes, a data of the stored script are transmitted to other light tubes.

11. The light box apparatus of claim 1, wherein a server is embedded in the controller of one light tube, other light tubes access the server for retrieving the stored script.

12. The light box apparatus of claim 1, wherein the multiple light tubes and the bracket are made as a content module.

13. The light box apparatus of claim 12, wherein there is a socket for connecting to the content module and for disabling original light tubes when necessary.

14. The light box apparatus of claim 1, wherein a proximity sensor is disposed on the light passing cover for detecting whether there is a user nearby and transmits the detected result to the controller to adjust controlling of the LED section.

15. The light box apparatus of claim 1, wherein the controller controls the LED sections to emit lights of different colors according to the stored script.

16. The light box apparatus of claim 1, wherein the LED tube comprises a speaker, the controller controls the speaker to generate a sound effect according to the stored script.

17. The light box apparatus of claim 1, wherein the LED section is covered by a lens for directing output light to one corresponding two-dimension block.

18. The light box apparatus of claim 1, wherein the LED section comprises an environment LED module and a light beam LED module, the light beam LED module is covered by a lens.

19. The light box apparatus of claim 1, wherein a second light passing cover printed with a second image is disposed on an opposite side of the light passing cover, each of the multiple LED tubes have two LED sides respectively having the LED sections corresponding to the image of the light passing cover and the second image of the second light passing cover respectively, the controller controls the first LED side and the second LED side independently.

20. The light box apparatus of claim 1, wherein the controller receives a wireless command from an external device, when the wireless command is received, the controller ignores the stored script and controls the LED sections according to the wireless command.

* * * * *